United States Patent [19]

Fukuda et al.

[11] Patent Number: 4,506,028

[45] Date of Patent: Mar. 19, 1985

[54] PROCESS FOR PREPARING A FUEL CELL ELECTRODE SUBSTRATE COMPRISING CARBON FIBERS

[75] Inventors: Hiroyuki Fukuda; Hisatsugu Kaji, both of Iwaki; Hiroto Fujimaki, Tokyo; Yoichiro Yamanobe, Iwaki; Masaru Hiruta, Iwaki; Sigeru Ohmi, Iwaki, all of Japan

[73] Assignee: Kureha Kagaku Kogyo Kabushiki Kaisha, Japan

[21] Appl. No.: 450,802

[22] Filed: Dec. 17, 1982

[30] Foreign Application Priority Data

Dec. 29, 1981 [JP] Japan .................... 56-214258

[51] Int. Cl.$^3$ .................... H01M 4/96; C01B 31/02; D01F 9/12; B29C 25/00
[52] U.S. Cl. .................... 502/101; 264/29.3; 264/29.5; 423/449; 429/40; 429/44; 502/418
[58] Field of Search ............ 502/101, 418; 264/29.3, 264/29.5, 29.6, 29.7; 423/445, 447.3, 449; 429/40, 44

[56] References Cited

U.S. PATENT DOCUMENTS

| | | | |
|---|---|---|---|
| 3,395,049 | 7/1968 | Thompson | 502/101 |
| 3,407,038 | 10/1968 | Beasley | 423/447.2 |
| 3,829,327 | 8/1974 | Omori et al. | 423/447.3 |
| 3,960,601 | 6/1976 | Schultz | 429/212 |
| 3,991,169 | 11/1976 | Makita et al. | 264/29.3 |
| 4,165,349 | 8/1979 | Sandeli | 264/29.1 |
| 4,374,906 | 2/1983 | Breault et al. | 429/44 |
| 4,426,340 | 1/1984 | Goller et al. | 264/29.1 |

FOREIGN PATENT DOCUMENTS 2432706 2/1975 Fed. Rep. of Germany .
166354 10/1982 Japan .
2095656 10/1982 United Kingdom .

*Primary Examiner*—P. E. Konopka
*Attorney, Agent, or Firm*—Cushman, Darby & Cushman

[57] ABSTRACT

An electrode substrate for a fuel cell having a high porosity, a good mechanical strength and electroconductivity and a sharp distribution of pore radii is prepared by a process comprising mixing 30 to 50% by weight of carbon fiber, 20 to 50% by weight of a binder and 20 to 50% by weight of an organic granule, press-shaping the resultant mixture, curing the shaped product and calcinating the cured product.

4 Claims, No Drawings

PROCESS FOR PREPARING A FUEL CELL ELECTRODE SUBSTRATE COMPRISING CARBON FIBERS

The present invention relates to a process for preparing a fuel cell electrode substrate based on carbon fiber as well as a product obtained by the process, and more precisely it relates to a process for preparing an electrode substrate in a fuel cell which has a high porosity, a good mechanical strength and electroconductivity, and a sharp distribution of pore radii, as well as a product prepared by the process.

A porous shaped article based on carbon fiber has attracted attention recently, in particular, in the fields of a filter material and a fuel cell electrode substrate. Particularly in the latter field, a porous carbonaceous article which has an excellent conductivity, chemical stability and mechanical strength, a high porosity and a sharp distribution of pore radii has been required.

Hitherto, a substrate for an electrode in a fuel cell has been prepared by the following processes;

(1). One of the processes comprises coating a web of carbon fiber with thermally decomposed carbon by a chemical vacuum evaporation as described in U.S. Pat. No. 3,829,327. However, this process is not economical due to an expensive vacuum evaporation step and the mechanical strength of the product is reduced when the porosity thereof is increased, although the carbon fiber paper obtained by the process is excellent in chemical stability, permeability to gas and electroconductivity.

(2). Another method comprises carbonizing a mat of pitch fiber in a non-oxidizing atmosphere, the mat of pitch fiber being obtained by using as a preliminary binder an alcohol having a boiling point of at least 150° C. as described in U.S. Pat. No. 3,991,169. However, the obtained product is defective in mechanical strength, although the porous sheet-like article obtained in this method has a high porosity and a good conductivity.

(3). A still another process comprises infusibilizing and carbonizing a web of pitch fiber produced by blow spinning to obtain a carbon fibrous web as described in U.S. Pat. No. 3,960,601. The mechanical strength of the product obtained by the process is lowered when its porosity is to be high, although its conductivity is high.

Furthermore, these processes have a common demerit that it is difficult to control the distribution of pore radii. Therefore, when an obtained carbonaceous article is used as an electrode substrate in a fuel cell, the gas diffuses unevenly at the surface of the electrode substrate resulting in the decrease of generating efficiency.

On the other hand, the electrode substrate prepared by one of the processes mentioned above is to be piled on a bipolar separator, and accordingly, it has been difficult to reduce cost of manufacturing a fuel cell.

Recently, an electrode substrate with rib has been proposed instead of the bipolar separator-type substrate as in U.S. Pat. No. 4,165,349, and accordingly, an electrode substrate which is less expensive and has more excellent electric, mechanical and structural properties has been studied.

The inventors developed a porous carbonaceous article having a sharp distribution of pore radii and filed an application with Japanese Patent Application No. 48700/81. The inventors have further studied a fuel cell electrode substrate and achieved the present invention.

It is an object of the invention to provide a process for preparing a fuel cell electrode substrate which has a high porosity, a sharper distribution of pore radii than the conventional one and an excellent electroconductivity and mechanical strength.

Another object of the invention is to provide such an electrode substrate with rib having such excellent properties.

A still another object of the invention is to provide an electrode substrate with rib for a large-scale fuel cell.

The process of the invention comprises mixing 30 to 50% by weight of carbon fiber, 20 to 50% by weight of a binder and 20 to 50% by weight of an organic granule, press-shaping the resultant mixture, curing the shaped product and calcinating the cured product.

The carbon fiber in the invention is short carbonaceous fiber having a fiber diameter in the range of 5 to 30$\mu$ and a fiber length in the range of 0.05 to 2 mm. With carbon fiber having a length of more than 2 mm, fibers tangle with one another to form a wool-pill in the course until shaping and a desired porosity and a desired shape distribution of pore radii are not obtained. The required strength of the product is not obtained with carbon fiber having a length of less than 0.05 mm.

The linear carbonizing shrinkage of the carbon fiber is in the range of 0.1 to 3.0% when the carbon fiber is calcinating up to 2000° C. With a larger shrinkage, there may cause cracks in the product on calcinating. With such carbon fibers a larger electrode substrate for fuel cell may be prepared according to the present invention.

The amount of the carbon fiber to be mixed in the invention is preferably in the range of 30 to 50% by weight.

The binder in the invention is used for binding carbon fibers as a carbonaceous binder after carbonizing treatment. The resin having a carbonizing yield in the range of 30 to 75% by weight is preferable for obtaining a desired porosity, for example, a phenol resin, pitch, a furfuryl alcohol resin, and the like, or a mixture thereof may be also used. Powdery phenol resin itself or a mixture of powdery phenol resin and powdery pitch is most preferable for dry blending, and an electrode substrate having excellent properties may be obtained with such a binder.

The amount of the binder to be mixed is preferably in the range of 20 to 50% by weight. With less than 20% by weight of the binder, the mechanical strength of the resulting substrate is low due to lack of the amount as the binder. On the other hand, the desired porosity and pore radii is not obtained with more than 50% by weight of the binder.

The organic granule is used for controlling the production of pores in the invention. The organic granule having a diameter in the range of 30 to 300$\mu$ is preferably used in order to regulate the porosity and pore radius. On the other hand, the organic granule used in the invention does not evaporate nor melt nor flow at 100° C. That is, the organic granule may thermally deformed but does not evaporate nor melt nor flow at the temperature and the pressure of shaping. An example of the preferable organic granule is polyvinyl alcohol, polyvinyl chloride, polyethylene, polypropylene, polystyrene or a mixture thereof. The carbonizing yield of the organic granule is 30% by weight or less. With an organic granule having a carbonizing yield of more than 30% by weight, it is difficult to control the porosity and/or pore radius.

The amount of the organic granule to be mixed is preferably in the range of 20 to 50% by weight according to the desired porosity and pore radii of the electrode substrate.

The relative amounts of the carbon fiber, the binder and the organic granule is preferably selected so that the weight ratio of the total amount of the carbon fiber and the organic granule to the amount of the binder falls in the range of 1.5 to 4.0. Without this range, the product which satisfies all requirements on the porosity, the bending strength, the permeability to gas and the bulk resistance is not obtained.

The process of the invention is described in more detail hereinafter.

The predetermined amounts of short carbon fiber cut into the length of 0.05 to 2 mm, a binder and an organic granule having the predetermined size are introduced into a mixing machine, stirred and blended homogeneously, preferably at a temperature of at most 60° C. since the binder may harden at higher temperature. Any conventional blender provided with blades may be used as the mixing machine.

The obtained uniform mixture is then press-shaped by a mold press or a continuous press with roller, the temperature and the pressure of pressing being suitably predetermined according to the size, thickness and form of a desired electrode substrate. When the temperature is too low, the hardening period of the binder is longer and it is unfavorable from the view point of productivity. When the pressure is too low, the carbon fibers is bound by the binder at least partially insufficiently and laminar cracks may be caused in the product. Usually, the press-shaping is carried out at a temperature in the range of 100° to 200° C. under a pressure in the range of 5 to 100 kg/cm$^2$ for 2 to 60 minutes.

The shaped product is then cured at about 150° C. under about 0.5 kg/cm$^2$ for 0.5 to 10 hours per 1 mm of thickness of the shaped product.

The cured product is then placed between graphite sheets under compression and then calcinated and carbonized at a temperature in the range of 1000° to 3000° C. for 0.5 to 5 hours in a calcinating oven under an inert atmosphere to obtain a desired electrode substrate.

According to the process of the invention, an electrode substrate of any size, for example a small one and a large one having the size up to 1000 mm×1000 mm×3 mm (in thickness) may be obtained, and the advantageous industrial utility is effected by the invention.

The product obtained by the process of the invention has excellent properties, for example, a high porosity of 40 to 85%, a mechanical strength such as a bending strength of 80 kg/cm$^2$ or more, a permeability to gas of 100 to 1000 ml/cm$^2$.hr.mm.Aq. and a bulk resistance of $5\times10^{-2}$ Ω.cm or less.

The electrode substrate of the invention has open pores and the porosity thereof is in the range of 40 to 85%. In a substrate having a porosity of less than 40%, the pressure loss of hydrogen or oxygen gas is high in the course of diffusion of gas through the substrate, and accordingly, the distribution of gases reached at the surface of the electrode becomes uneven resulting in the decrease of generating efficiency. A substrate having a porosity of more than 85% is too weak in the mechanical strength to be used as an electrode substrate.

The electrode substrate of the invention has a bending strength of 80 kg/cm$^2$ or more. A substrate with a bending strength of less than 80 kg/cm$^2$ is easily broken on coating of a catalyst, forming of Teflon film or constructing of a cell, resulting in the increase of cell cost.

The electrode substrate of the invention has a permeability to gas, hydrogen or oxygen, in the range of 100 to 1000 ml/cm$^2$.hr.mm.Aq. If the gas permeability is less than 100 ml/cm$^2$.hr.mm.Aq., the pressure loss is high in the course of diffusion of hydrogen or oxygen gas through the substrate, resulting in the uneven distribution of gas at the surface of the electrode. When the gas permeability is more than 1000 ml/cm$^2$.hr.mm.Aq., the substrate has large pores, resulting in the decrease of mechanical strength and the uneven distribution f gas supply at the surface of the electrode.

The electrode substrate of the invention has a bulk resistance in the range of $5\times10^{-2}$ Ω.cm or less. If the bulk resistance in the direction of thickness is more than $5\times10^{-2}$ Ω.cm the electric resistance of the substrate is high and generating efficiency is reduced.

The pore radii are required to be in the range of 10 to 30μ for a fuel cell electrode substrate. According to the invention, about 70% or more pores of the electrode substrate obtained by the process of the invention have a radius in the range of 5 to 30μ.

The invention is described in more detail while referring to the following non-limiting example.

EXAMPLE

Carbon fiber of pitch having diameter of 12 to 16μ and length of 0.1 to 0.6 mm, a granular binder having diameter of at most 100μ and an organic granule of which at least 70% by weight have diameter of 30 to 100μ were uniformly blended at room temperature in a blender provided with blades. The compositions of three components are shown in Table 1. In Table 1 are also shown the shrinkage of the carbon fiber and the kinds used of the binder and the organic granule.

TABLE 1

| No. | Carbon Fiber Wt % | Shrinkage | Binder Wt % | Binder Kind | Organic Granule Wt % | Organic Granule Kind |
|---|---|---|---|---|---|---|
| 1 | 40 | 1.7 | 30 | Phenol Resin[1] | 30 | PVA[3] |
| 2 | 30 | 1.7 | 30 | Phenol Resin | 40 | PVA |
| 3 | 40 | 1.7 | 35 | Phenol Resin | 25 | PVA |
| 4 | 40 | 1.2 | 30 | Phenol Resin | 30 | PVA |
| 5 | 40 | 1.7 | 30 | Mixture[2] | 30 | PVA |
| 6 | 40 | 1.7 | 30 | Phenol Resin | 30 | PVC |
| 7 | 40 | 1.7 | 30 | Phenol Resin | 30 | PE |

Note
[1]Manufactured by Cashew Chem. Ind. Co., Japan, No. 5.
[2]Composed by 35% by weight of pitch and 65% by weight of phenol resin (Note 1).
[3]Manufactured by The Nippon Synthetic Chemical Industry Co., Ltd. Japan, P-250.

The linear shrinkage (%) of the carbon fiber was calculated by elevating the temperature of the fiber bundles up to 2000° C. at the rate of 750° C. per hour, maintaining the temperature for 30 minutes, allowing to cool and then measuring the length of the fiber bundle.

The carbonizing yield of the binder or the organic granule was measured by the method according to JIS-M-8802 and each carbonizing yield are as follows;

(1) Binder:
  Phenol resin (Note 1 of Table 1);               48%
  Mixture (Note 2 of Table 1);                    59%
(2) Organic Granule:
  Polyvinyl alcohol (PVA, Note 3 of Table 1);    0.9%
  Polypropylene;                                  0.8%
  Polyvinyl chloride (PVC);                       5.6%

-continued

| Polyethylene (PE); | 0.1% |
| Polystyrene; | 1.0% |

After blending three components, the resulting mixture was introduced into a plate mold provided with rib of a dimension of 1000 mm×1000 mm and pressed at 130° C., 75 kg/cm² for 5 minutes. The shaped product of 3 mm in thickness was then cured at 0.5 kg/cm² in an oven of 150° C. for 6 hours to harden completely the binder. The resulting product was placed between graphite sheets and calcinated at 2000° C. under inert atmosphere for 1 hour.

The physical properties of the obtained electrode substrate with rib are shown in Table 2.

As seen from Table 2, the electrode substrates of the invention show excellent physical properties as a fuel cell electrode substrate. Furthermore, there caused no crack in the substrate even on calcinating at 2000° C.

TABLE 2

| No. | Porosity Vol. % | Bending Strength kg/cm² | Gas Permeability ml/cm²·hr.mm.Aq. | Bulk Resistance Ω·cm |
| --- | --- | --- | --- | --- |
| 1 | 67 | 165 | 130 | $2.9 \times 10^{-2}$ |
| 2 | 70 | 130 | 240 | $3.5 \times 10^{-2}$ |
| 3 | 60 | 180 | 105 | $2.1 \times 10^{-2}$ |
| 4 | 68 | 150 | 145 | $3.3 \times 10^{-2}$ |
| 5 | 58 | 195 | 101 | $2.5 \times 10^{-2}$ |
| 6 | 66 | 176 | 398 | $2.3 \times 10^{-2}$ |
| 7 | 64 | 156 | 980 | $2.6 \times 10^{-2}$ |

In Table 2, the physical properties were measured as follows:

(a) Porosity (Vol %):

The porosities were measured in accordance with the Japanese Industrial Standard, JIS-Z-2056 (1976).

(b) Bending Strength (kg/cm²):

The bending strengths were measured on samples of size 100 mm×100 mm×2.5 mm (in thickness) in accordance with JIS-K-6911.

(c) Gas Permeability (ml/cm².hr.mmAq.):

After both ends of each cylindrical sample substrate were put between two hollow, cylindrical tubes, a predetermined amount of air flow was supplied from one end of the sample to the another end which was open to the atmosphere to measure the pressure loss between two ends of the sample. The gas permeabilities $Q_s$ were determined from the following equation:

$$Q_s = \frac{10 \times 60 \times 10^3}{50.24 \times \Delta p} \text{ (ml/cm}^2\text{.hr.mmAq.)}.$$

wherein $\Delta p$ is the measured pressure loss (mmAq.), 50.24 (cm²) represents the measured area, i.e. a circle of 80 mm in diameter, and 10 (l/min.) is the predetermined amount of air flow.

(d) Bulk Resistance (Ω.cm):

In accordance with SRIS (Standards of the Japan Rubber Association) 2301-1969, both end surfaces of each sample substrate were coated with an electroconductive coating material to measure the electrical resistance between the two ends of the sample. The bulk resistances $\rho_v$ (Ω.cm) were calculated from the measured electrical resistances R (Ω) by the following equation:

$$\rho_v = R \cdot w \cdot t / l$$

wherein l is the longitudinal length (cm) between two ends of the sample (in the measured direction) and w and t are the length (cm) and width (cm), respectively, defining the cross section of the sample.

What is claimed is:

1. A process for preparing a fuel cell electrode substrate, comprising mixing (a) 30–50% by weight of carbon fibers having a diameter of 5–30μ, a length of 0.05–2 mm and a linear carbonizing shrinkage on calcinating at 2,000° C. of 0.1–3.0%, (b) 20–50% by weight of a carbonaceous resin binder having a carbonizing yield of 30–75% by weight, and (c) 20–50% by weight of an organic granule for controlling the production of pores in the product electrode substrate which has a carbonizing yield of at most 30% by weight and a diameter of 30–300μ and does not evaporate nor melt nor flow at 100° C., press-shaping the resultant mixture at a temperature of 100°–200° C. under a pressure of 5–100 kg/cm² for 2–60 minutes, curing the shaped product at about 150° C. under about 0.5 kg/cm² for 0.5–10 hours per 1 mm in thickness of the shaped product, calcinating the cured product at a temperature of 1,000°–3,000° C. under an inert atmosphere for 0.5–5 hours and thereafter recovering an electrode substrate having a porosity of 40 to 85%, a bending strength of at least 80 kg/cm², a gas permeability of 100 to 1000 ml/cm².hr.mm.Aq and a bulk resistance of at most $5 \times 10^{-2}$ Ωcm.

2. The process of claim 1, wherein the weight ratio of the total amount of the carbon fibers and the organic granule to the amount of the binder is 1.5–4.0.

3. The process of claim 1, wherein the binder is a phenol resin or a mixture of a phenol resin and pitch.

4. The process of claim 1, wherein the organic granule is selected from the group consisting of polyvinyl alcohol, polyvinyl chloride, polyethylene, polypropylene, polystyrene and a mixture thereof.

* * * * *